US012615346B2

(12) United States Patent
Kvamstad et al.

(10) Patent No.: US 12,615,346 B2
(45) Date of Patent: Apr. 28, 2026

(54) SYSTEMS AND METHODS FOR AUTOMATIC DETECTION OF MEETING REGIONS AND FRAMING OF MEETING PARTICIPANTS WITHIN AN ENVIRONMENT

(71) Applicant: Huddly AS, Oslo (NO)

(72) Inventors: Bendik Kvamstad, Oslo (NO); Jon Tore Hafstad, Oslo (NO); Lars Erling Stensen, Oslo (NO); Stian Selbek, Koppang (NO); Therese Byhring, Oslo (NO); Anders Skibeli Rokkones, Oslo (NO); Lars Heimdal, Oslo (NO); Trym Nordal, Oslo (NO); Robin Andlauer, Oslo (NO)

(73) Assignee: HUDDLY AS, Oslo (NO)

( * ) Notice: Subject to any disclaimer, the term of this patent is extended or adjusted under 35 U.S.C. 154(b) by 164 days.

(21) Appl. No.: 18/202,380

(22) Filed: May 26, 2023

(65) Prior Publication Data

US 2024/0257383 A1     Aug. 1, 2024

Related U.S. Application Data

(60) Provisional application No. 63/441,649, filed on Jan. 27, 2023.

(51) Int. Cl.
   *H04N 7/15*      (2006.01)
   *G06T 7/70*      (2017.01)
       (Continued)

(52) U.S. Cl.
   CPC .................. *H04N 7/15* (2013.01); *G06T 7/70* (2017.01); *G06V 20/46* (2022.01); *H04L 65/403* (2013.01);
       (Continued)

(58) Field of Classification Search
None
See application file for complete search history.

(56) References Cited

U.S. PATENT DOCUMENTS

| | | | |
|---|---|---|---|
| 11,350,029 B1 | 5/2022 | Ostap et al. | |
| 2013/0083153 A1* | 4/2013 | Lindbergh ............... | H04N 7/15 348/E7.083 |

(Continued)

OTHER PUBLICATIONS

Extended European Search Report dated Dec. 5, 2023, for corresponding European Application No. 23176876.3-1208. (16 pages).

*Primary Examiner* — Quoc D Tran
(74) *Attorney, Agent, or Firm* — FINNEGAN, HENDERSON, FARABOW, GARRETT & DUNNER LLP

(57)          ABSTRACT

Consistent with disclosed embodiments, systems and methods for analyzing video output streams and generating a primary video stream may be provided. Embodiments may include a video conferencing camera configured to generate a video output representative of an environment. The video conferencing camera may comprise a video processing unit configured to determine, for a plurality of subjects represented in the video output, whether each of the plurality of subjects is inside or outside of a meeting region within the environment. The video processing unit may be further configured to determine a frame configuration for a primary video stream, constituting a portion of the video output, to be shown on a display based on one or more characteristics of at least one subject, among the plurality of subjects, determined to be located inside the meeting region. Furthermore, the video processing unit may be configured to, in determining the frame configuration for the primary video stream, ignore one or more subjects, among the plurality of subjects, determined to be located outside the meeting region.

48 Claims, 8 Drawing Sheets

(51) Int. Cl.

| | | |
|---|---|---|
| *G06V 20/40* | (2022.01) | |
| *H04L 65/403* | (2022.01) | |
| *H04N 5/262* | (2006.01) | |
| *H04N 7/14* | (2006.01) | |

(52) U.S. Cl.
   CPC ........... *H04N 5/2628* (2013.01); *H04N 7/142* (2013.01); *H04N 7/144* (2013.01); *H04N 7/147* (2013.01); *H04N 7/152* (2013.01)

(56) References Cited

U.S. PATENT DOCUMENTS

| | | | |
|---|---|---|---|
| 2018/0063479 A1 | 3/2018 | Nimri et al. | |
| 2018/0063482 A1* | 3/2018 | Goesnar | H04N 23/58 |
| 2018/0176508 A1 | 6/2018 | Pell | |
| 2019/0108623 A1 | 4/2019 | Carey et al. | |
| 2019/0215464 A1* | 7/2019 | Kumar | H04N 7/08 |
| 2020/0099889 A1* | 3/2020 | Sugihara | H04N 7/147 |
| 2020/0099890 A1* | 3/2020 | Tanaka | H04N 7/147 |
| 2020/0322536 A1 | 10/2020 | Johansen et al. | |
| 2021/0392294 A1 | 12/2021 | Bran | |
| 2022/0329727 A1* | 10/2022 | Bryan | H04N 23/64 |
| 2023/0237837 A1* | 7/2023 | Shepherd | G06V 40/166 |
| | | | 382/104 |
| 2024/0031529 A1* | 1/2024 | Chu | H04N 7/15 |
| 2024/0054786 A1* | 2/2024 | Andresen | H04N 5/2628 |

* cited by examiner

SYSTEMS AND METHODS FOR AUTOMATIC DETECTION OF MEETING REGIONS AND FRAMING OF MEETING PARTICIPANTS WITHIN AN ENVIRONMENT

CROSS-REFERENCE TO RELATED APPLICATIONS

This application claims the benefit of priority of U.S. Provisional Application No. 63/441,649, filed Jan. 27, 2023, which is incorporated herein by reference in its entirety.

TECHNICAL FIELD AND BACKGROUND

The present disclosure relates generally to video conferencing systems and, more specifically, to systems and methods for automatic detection and framing of meeting participants and meeting regions by determining (i) boundaries of a meeting region, (ii) whether a subject is inside or outside the meeting region, and/or (iii) whether a subject should be captured within a frame configuration.

When placed in an open space or in a meeting room with windows or glass walls, traditional systems may include representations of people in a video conference feed who are not participants of the meeting (e.g., non-participant). For example, traditional systems may capture and/or frame a non-participant walking outside a meeting room or in the background of a meeting region, and an automatic framing feature may capture/frame and display the non-participant in the video conference feed. The capture and/or framing, and subsequent display, of a non-participant may disturb the meeting experience for those participating in the meeting.

The presently disclosed embodiments are aimed toward providing a video conferencing system configured to properly identify meeting participants and feature those meeting participants in a video output. Non-meeting participants may be excluded from the video conference output.

SUMMARY

Embodiments consistent with the present disclosure include video conferencing cameras configured to generate a video output representative of an environment. The video conferencing camera may comprise a video processing unit, and the video processing unit may be configured to determine, for a plurality of subjects represented in the video output, whether each of the plurality of subjects is inside or outside of a meeting region within the environment. The video processing unit may further determine a frame configuration for a primary video stream, constituting a portion of the video output, to be shown on a display based on one or more characteristics of at least one subject, among the plurality of subjects, determined to be located inside the meeting region. Furthermore, the video conferencing camera may, in determining the frame configuration for the primary video stream, ignore one or more subjects, among the plurality of subjects, determined to be located outside the meeting region. In some embodiments, the video conferencing camera may be configured to communicate with at least one additional video conferencing camera to provide a multi-camera video conferencing system.

The disclosed cameras and camera systems may include a video conferencing camera or multi-camera system configured to determine/infer certain dynamics of the meeting room participants (e.g., using artificial intelligence (AI), such as trained networks). For example, disclosed embodiments may involve techniques for determining whether to include a representation of a subject in a video frame or feed to provide seamless, accurate automatic framing of meeting participants while not responding to, or ignoring or excluding, representations of non-participants.

In some embodiments, by estimating the location of people in an image or video output and/or by determining how far away each person is from the video conferencing camera, disclosed systems and methods may promote automatic framing of meeting participants and exclusion of non-participants in a video conference feed or output. A deep learning model can be trained by supervision using a dataset of images and corresponding labels, and the model may be used to describe the location of each person that is visible in a video output by providing location coordinates relative to the video conferencing camera. Furthermore, in some embodiments, the deep learning model may describe where each person is in a video output, how far each person is from the video conferencing camera, and/or whether the person is located within a meeting region.

Furthermore, in some embodiments, lateral and longitudinal coordinates relative to a top-down view of each person captured in a video output can be calculated using (i) a depth estimation, and (ii) an angle $\alpha$ between an optical axis of the camera and a vector originating from the camera and extending in the direction of the person. The angle $\alpha$ can be derived from camera parameters, which may be previously known, and the predicted lateral location of the person in the image plane may be determined. The estimated location of the person in the top-down view may be compared with a focus area or meeting region, and if the estimated location of the person is determined to be outside the focus area or meeting region, the person may be ignored and/or excluded from focused video streams (e.g., in automatic framing).

BRIEF DESCRIPTION OF THE DRAWINGS

The accompanying drawings, which are incorporated in and constitute a part of this specification, illustrate disclosed embodiments and, together with the description, serve to explain the disclosed embodiments. The particulars shown are by way of example and for purposes of illustrative discussion of embodiments of the present disclosure. The description taken with the drawings makes apparent to those skilled in the art how embodiments of the present disclosure may be practiced.

DETAILED DESCRIPTION

Figure 1:
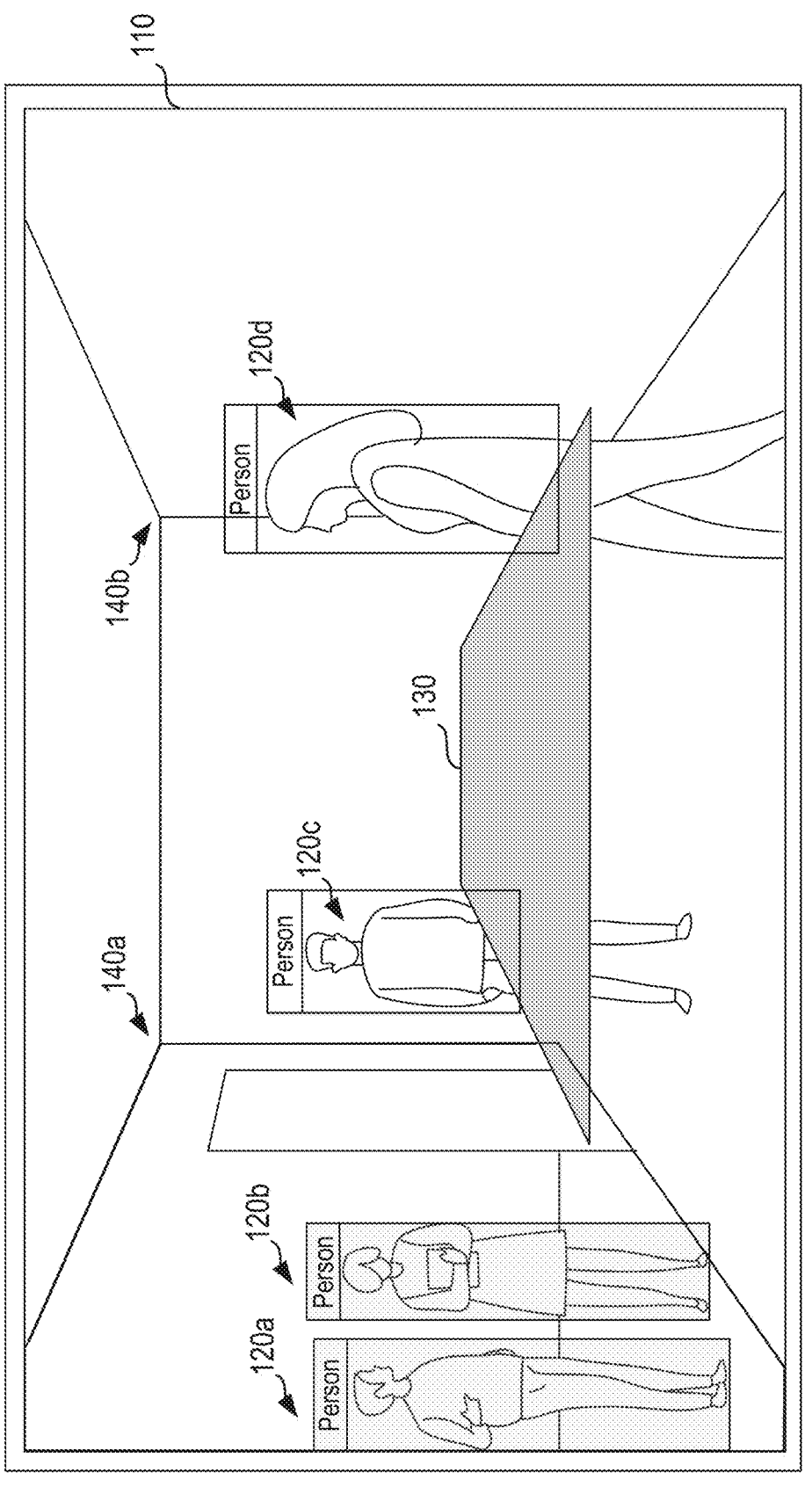
FIG. 1 is an illustration of an example video output generated by a video conferencing camera, consistent with some embodiments of the present disclosure.

Embodiments of the present disclosure include video conferencing cameras. As used herein, a video conferencing camera may include a camera that is configured to capture images representative of an environment, such as a meeting room or a space including a meeting room or meeting location. The disclosed cameras may include any device suitable for acquiring images. In some cases, the cameras may include one or more light-sensitive sensors configured to capture a stream of image frames. Examples of such cameras may include, but are not limited to, Huddly® IQ, L1 or S1 cameras, digital cameras, smart phone cameras, compact cameras, digital single-lens reflex (DSLR) video cameras, mirrorless cameras, action (adventure) cameras, 360-degree cameras, medium format cameras, webcams, or any other device for recording visual images and generating corresponding video signals.

In some embodiments, a video conferencing camera may generate a video output representative of an environment. An environment may include a space within the field of view of at least one video conferencing camera. Video conferencing environments may include meeting rooms, space surrounding a meeting room, board rooms, court rooms, classrooms, open areas within a building, etc. An environment may also include meeting spaces. Such meeting spaces may include any location in which at least one camera is able to capture at least one image of at least one meeting participant. In some cases, meeting spaces may include fixtures (e.g., a meeting table and chairs, etc.), and the fixtures may be arranged in a room or within an open space (e.g., open plan office space, warehouse, outdoors, etc.).

Furthermore, a video conferencing camera may include at least one video processing unit. The at least one video processing unit may be configured to process the video output generated by the video conferencing camera. As used herein, a video processing unit may include any electronic circuitry designed to manipulate and alter memory to create or process images and frames intended for output (in, for example, a video output) to a display device. A video processing unit may include one or more microprocessors or other logic based devices configured to receive digital signals representative of acquired images. The disclosed video processing unit may include application-specific integrated circuits (ASICs), microprocessor units, or any other suitable structures for analyzing acquired images, selectively framing subjects based on analysis of acquired images, generating output video streams, etc. In some cases, the at least one video processing unit may be located within a single camera. In other embodiments, the at least one video processing unit may be distributed among multiple cameras and/or devices. For example, the at least one video processing unit may be distributed among a group of electronic devices including one or more cameras (e.g., a multi-camera system), personal computer, a mobile device (e.g., tablet, phone, etc.), and/or one or more cloud-based servers. Therefore, disclosed herein is a video conferencing system comprising at least one camera and at least one video processing unit, as described herein. The at least one video processing unit may or may not be implemented as part of the at least one camera. The at least one video processing unit may be configured to receive video output generated by the one or more video conferencing cameras. The at least one video processing unit may decode digital signals to display a video and/or may store image data in a memory device. In some embodiments, a video processing unit may include a graphics processing unit. It should be understood that where a video processing unit is referred to herein in the singular, more than one video processing units is also contemplated. The various image processing steps described herein may be performed by the at least one video processing unit, and the at least one video processing unit may therefore be configured to perform a method as described herein, or any of the steps of such a method. Where a determination of a parameter, value, or quantity is disclosed herein, it should be understood that the at least one video processing unit may perform the determination, and may therefore be configured to perform the determination.

Referring to FIG. 1, a diagrammatic representation of an overview video output 100 generated by a video conferencing camera is provided. As discussed above, a video conferencing camera may record or broadcast one or more representations of an environment, such as the environment represented in FIG. 1. The environment, as shown in FIG. 1, may include a meeting room and an office space surrounding the meeting room. As shown in FIG. 1, the meeting room may include one or more glass walls 110, and the glass walls 110 may form a boundary of the meeting room. Furthermore, as shown in FIG. 1, the meeting room may include a conference table 130. Additionally, or alternatively, glass walls 110 may be any type of transparent wall or barrier and need not be made of glass.

Multiple people may be visible in video output 100, such as persons 120*a-d*. In some embodiments, the video processing unit may process video output 100 to determine whether each person of persons 120*a-d* is inside or outside of a meeting region (e.g., a meeting room or meeting space) within the environment. As used herein, a meeting region may include an area of interest, or focus area, that may include the people, objects, or other items involved in a meeting or video conference setting. Non-limiting examples of a meeting region include a room; a part or portion of a room; a region around and including one or more furniture items; and a sub-region of an open space, such as a warehouse, open office plan, or an outdoor location; etc. People located inside the meeting region may be determined to be subjects involved in the meeting or video conference, and thus the video processing unit may determine and/or select frames or framing configurations based on detected characteristics of the subjects involved in a meeting (e.g., speaking, gestures, head pose, looking direction and changes in looking direction, movements, facial reactions, etc.). Such characteristics may be referred to as "meeting participation characteristics," or "characteristics indicative of meeting participation." The subjects involved in the meeting may be referred to as "participants," or "meeting participants." People located outside the meeting region may be determined to be non-subjects of the meeting or video conference, otherwise referred to as "non-participants." The disclosed video processing units may determine and/or select frames or framing configurations for an output video stream without regard for characteristics associated with the non-subjects or non-participants.

The video processing unit may determine that persons 120a, 120b are located outside the meeting region, and that persons 120c, 120d are located inside the meeting region. In one example, the determination of whether each person is inside or outside of the meeting region may be based on whether each person resides on a particular side of a glass barrier, such as glass wall 110. For example, persons 120a, 120b may be determined, by the video processing unit, to reside on a side of a glass wall 110 opposite to a location from which a video conferencing camera generating video output 100 is located, and therefore to be located outside the meeting region. Persons 120c, 120d may be determined, by the video processing unit, to reside on the same side of glass wall 110 as the video conferencing camera that is generating video output 100, and therefore to be located inside the meeting region. In other words, the determination of whether each of the people or subjects is inside or outside of the meeting region may include a determination of whether each of the people or subjects resides on a side of a glass wall opposite to the video conferencing camera, wherein a person or subject is determined to be outside the meeting region if they reside on the side of a glass wall opposite to the video conferencing camera. It is contemplated that the glass wall 110 may be any transparent or translucent barrier, and is not limited to glass walls 110 shown in FIG. 1. Other non-limiting examples of a transparent or translucent (e.g., glass) barrier may include a window, a screen, or a door, which may be made of glass or another transparent or translucent material (e.g., glass). Furthermore, in some embodiments, the determination of whether each person is inside or outside of the meeting region may be based on whether each person resides on a particular side of any barrier including—but not limited to—a fence, a screen, netting, pillars, or any other structure that may allow the environment surrounding a meeting region or room to be captured by a video conferencing camera located within the meeting region or room.

Embodiments of the present disclosure may include using one or more trained systems, models, or algorithms to determine various characteristics or parameters associated with a video output or representations shown in the video output. The trained system, model, or algorithm may include any type of machine learning algorithm including supervised, semi-supervised, unsupervised, and reinforcement algorithms. For example, the trained system may include a neural network, such as an artificial neural network (ANN) or a simulated neural network (SNN). As used herein, a trained system may pertain to a system that may analyze the video output representative of the environment and output information based on the video output.

In some embodiments, the location of each person in a video output may be determined, by the video processing unit, based on an output of a trained system (e.g., trained neural network). Additionally, or alternatively, the determination of whether each person is inside or outside of the meeting region may be based on an output of the trained system (e.g., trained neural network). For example, the determination of whether each person is on the side of the glass barrier opposite to the video conferencing camera may be performed by the trained system (e.g., trained neural network). The trained system may be configured to receive one or more frames (or images) of video output 100 of FIG. 1, and infer a location of glass wall 110; a location of room corners 140a, 140b; the presence and/or location of conference table 130; a distance of each person 120a-d from the video conferencing camera; the dimensions or boundaries of the meeting room (e.g., based on the location of glass walls 110 and/or corners 140a, 140b); and/or whether each person is located within or outside the meeting room. The video processing unit may therefore implement or use a trained model or algorithm (e.g., a trained neural network) to determine whether each person is inside or outside of the meeting region. The trained model or algorithm may take, as an input, video output 100. For example, the trained model or algorithm may receive as input at least one frame of video output 100 and output an indication of whether each of the persons or subjects resides on a side of a glass wall opposite to the video conferencing camera or is inside or outside of the meeting region.

Such capabilities may be achieved by training one or more neural networks using large sets of labeled image data (e.g., annotated image frames for which information associated with subjects in an environment is known (e.g., whether each subject is a meeting participant or non-participant, distances to subjects in an environment, relative locations of subjects in an environment, etc.). The network(s) may be trained by comparing generated outputs with known information associated with the training data. The network is penalized for generating an incorrect output and rewarded for generated a correct output. In this way, the performance of the network can be refined to provide a trained network that may be highly proficient at correctly inferring information relative to an environment and/or subjects in an environment.

It is further contemplated that various other devices and/or techniques may be used in combination with or as alternatives to trained networks to determine information relating to an environment and/or subjects in an environment. For example, a range finder (e.g., LiDAR, acoustic) may be used to sense a glass barrier, or otherwise determine boundaries of a room or area of interest, distances to subjects in an environment, etc. As another example, one or more sensors, such as directional microphones, may be used to assist in determining a location of persons inside and/or outside of the meeting region, whether persons are speaking or actively listening, subjects to whom a speaker is speaking, etc.

Figure 2A:
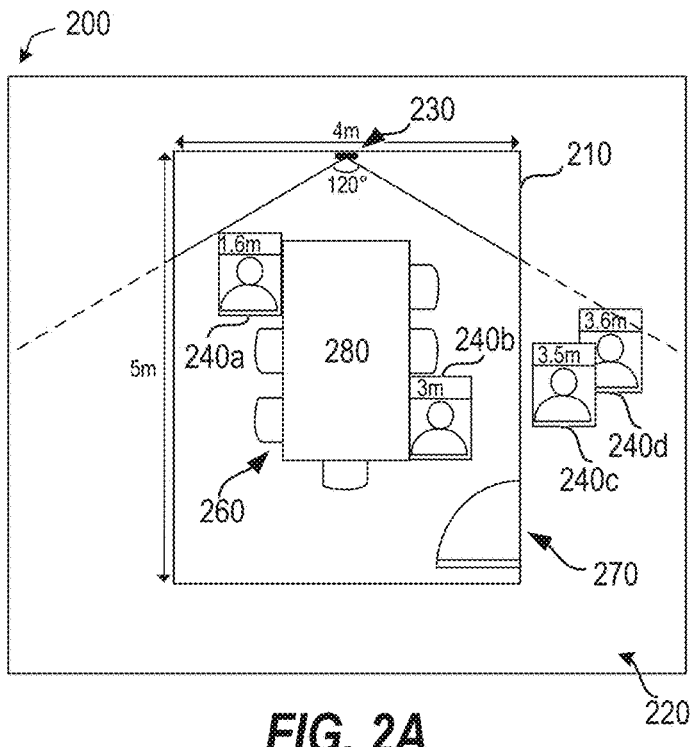
FIG. 2A is a diagrammatic representation of a top-view of an environment, consistent with some embodiments of the present disclosure.
Figure 2B:
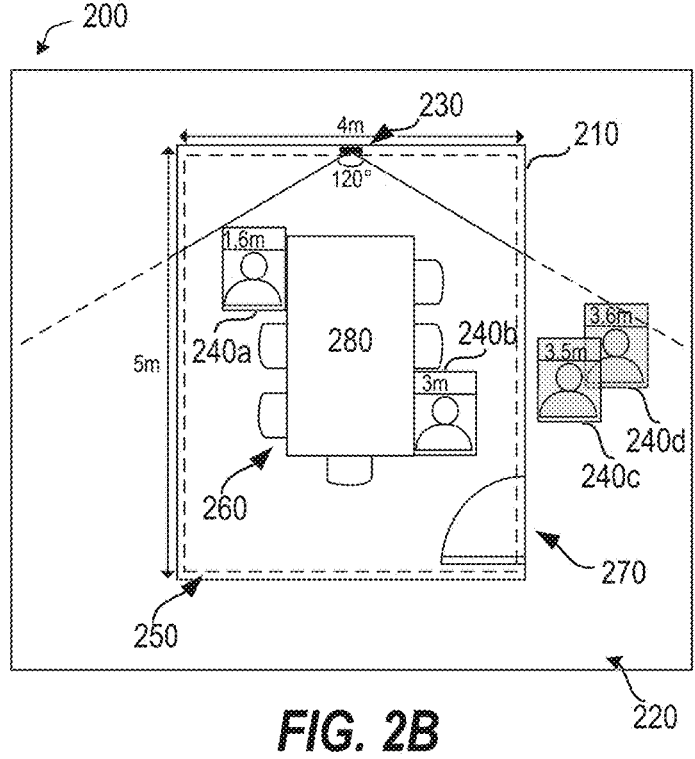
FIG. 2B is the diagrammatic representation of the top-view shown in FIG. 2A, including techniques for determining whether each of the plurality of subjects is inside or outside of a meeting region, consistent with some embodiments of the present disclosure.

Other techniques for determining whether subjects constitute meeting participants may also be used. FIGS. 2A and 2B are diagrammatic representations of a top-view of an environment 200 and represent another exemplary technique for determining whether each of a plurality of subjects is inside or outside of a meeting region. As shown in FIGS. 2A-2B, video conferencing camera 230 may be placed within meeting room (or meeting region) 210. Meeting room 210 may include persons 240a, 240b; conference table 280; chairs 260; and door 270. Video conferencing camera 230 may include a camera with a 120° field of view, which may capture portions of meeting room 210 and surrounding environment 220. Portions of meeting room 210 and surrounding environment 220 may form the environment that is captured or recorded in the video output of video conferencing camera 230. The video processing unit of video conference camera 230 may be configured to, for example, include one or more processors configured to determine a location of each person represented in the captured video output. For example, persons 240*a-d* may be represented in the video output, and the location of each person 240*a-d* may be determined by, for example, a technique represented in FIG. 2C (discussed further below).

As shown in FIGS. 2A-2B, depth estimations may be determined for each person in the video output, including both people within and outside of the meeting region. A trained system (e.g., trained neural network), as discussed above, may be used by the at least one video processing unit to determine the depth estimations. For example, the trained system or model may infer and output a distance value (e.g., depth estimation) between the video conferencing camera and each of persons 240*a-d*, and the determination of whether each person 240*a-d* is inside or outside the meeting region may be based on the distance value. For example, the depth estimation associated with person 240*a* may be 1.6 m; the depth estimation associated with person 240*b* may be 3 m; the depth estimation associated with person 240*c* may be 3.5 m, and the depth estimation associated with person 240*d* may be 3.6 m. In environment 200 of FIGS. 2A-2C, a depth estimation greater than 3 m may be determined to be outside of meeting region 250. Thus, persons that are associated with a depth estimation greater than 3 m, such as persons 240*c*, 240*d* may be determined to be located outside of meeting region 250. Furthermore, persons associated with a depth estimation less than or equal to 3 m, such as persons 240*a*, 240*b* may be determined to be located inside the meeting region 250. As shown in FIG. 2B, meeting region 250 may constitute a portion of meeting room 210. For example, meeting region 250 may be a region of interest, or focus area, of the meeting or video conference. The video processing unit may therefore implement or use a trained model or algorithm (e.g., a trained neural network) to determine the depth estimations. The trained model or algorithm may take, as an input, video output 100. For example, the trained model or algorithm may receive as input at least one frame of video output 100 and output the depth estimations.

Meeting region 250 may have any suitable shape. As shown in FIG. 2B, for example, meeting region 250 has a rectangular shape. In some cases, meeting region 250 may be circular, elliptical, semi-circular, trapezoidal, may include one or more arced sides, etc. In the example above, the depth threshold of 3 m may be used for arced, circular, or semi-circular meeting regions, or as a coarse threshold for square or rectangular meeting regions. In other cases, however, the depth threshold may vary according to the geometry of a particular meeting region shape in order to more precisely identify subjects determined to be within and outside of a predetermined meeting region.

Figure 2C:
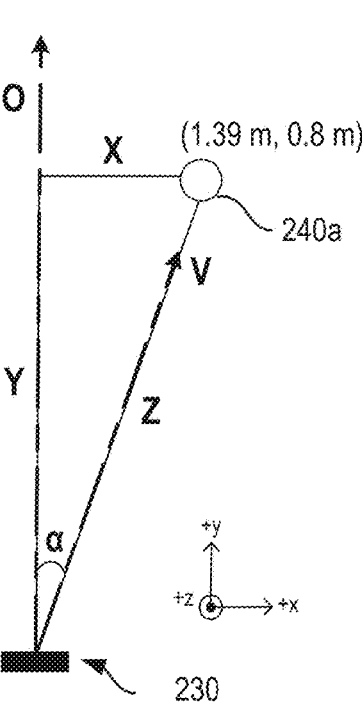
FIG. 2C is a diagrammatic representation of an example technique for determining the location of a subject or person within an environment, consistent with some embodiments of the present disclosure.

FIG. 2C is a diagrammatic representation of an example technique for determining the location of a subject. With respect to FIGS. 2A-2B, FIG. 2C shows a calculation of coordinates of person 240*a* based on an indicator of depth, such as depth estimation Z, and an angle α. Angle α may be determined by optical axis O of video conferencing camera 230 and vector V associated with person 240. For example, angle α may be determined to be 60° based on an angle between optical axis O and vector V. Depth estimation Z may be determined to be 1.6 meters (m). The lateral and longitudinal coordinates of person 240*a* may be determined based on trigonometric ratios, and the lateral and longitudinal coordinates may be used to determine whether person 240*a* is inside or outside of the meeting region. For example, the lateral and longitudinal coordinates of person 240*a* may be calculated as follows:

$$\sin(\alpha) = \frac{X}{Z} \qquad \text{Equation 1}$$

$$\cos(\alpha) = \frac{Y}{Z} \qquad \text{Equation 2}$$

$$\tan(\alpha) = \frac{X}{Y} \qquad \text{Equation 3}$$

$$X^2 + Y^2 = Z^2 \qquad \text{Equation 4}$$

Because angle α and depth estimation Z are known, X may be determined using Equation 1, and Y may be determined using Equation 2. It is contemplated that X or Y may be calculated using Equation 1 or Equation 2, respectively, and the remaining variable (Y or X, respectively) may be calculated using Equation 4. As shown in FIG. 2C, the lateral and longitudinal coordinates for person 240*a* may be determined to be 1.39 m and 0.8 m, respectively.

It is further contemplated that the determination of whether each person is inside or outside of the meeting room 210 may be based on a determined three-dimensional position associated with each person. For example, as shown in FIG. 2C, a location of person 240*a* may be determined in x, y, and z directions (based on the axes shown in FIG. 2C). The location in the x and y directions may be calculated based on methods discussed above with respect to lateral (e.g., x) and longitudinal (e.g., y) coordinates. In some embodiments, the location of person 240*a*, and any other person located in environment 200, in the z-direction may be determined, for example, based on depth information for person 240*a* and an image location associated with person 240*a* in a captured image frame.

Figure 3:
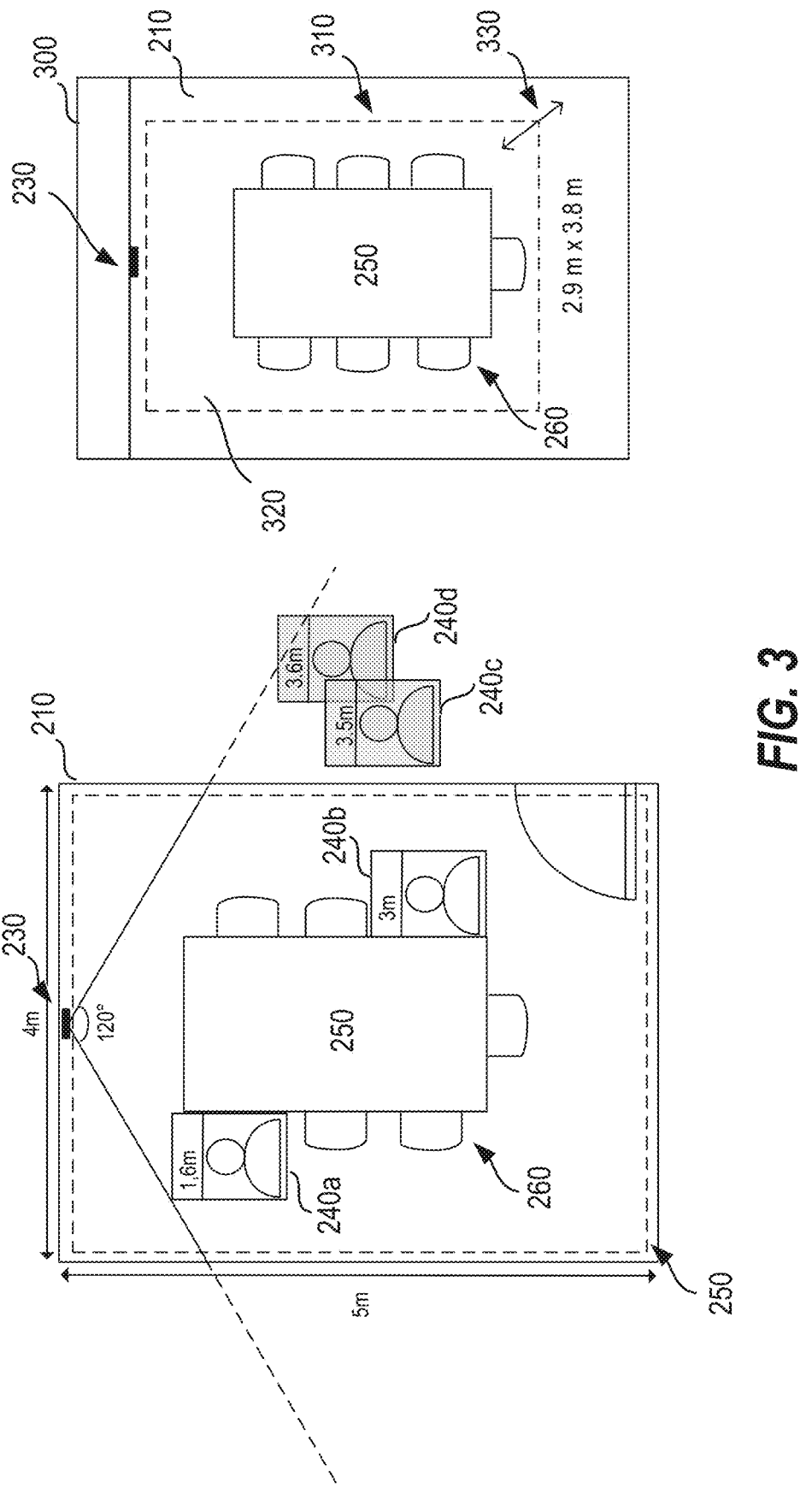
FIG. 3 is the diagrammatic representation of the top-view shown in FIG. 2B and a display showing a representation of the top-view of FIG. 2B.

The size and shape (in some examples) of meeting region 250 may be predetermined, automatically determined based on environment features, and/or user selected. FIG. 3 provides a diagrammatic representation of a top-view of an environment (as shown in FIG. 2B) together with a representation of an application-based user interface shown on a display 300 of a mobile device, tablet, console, etc. In some embodiments, a spatial envelope 310 is shown on display 300 to provide a user with feedback regarding the size and shape being used by the system to establish a meeting region—in this case, a meeting region 320. In this way, a user may better understand how meeting region 320 compares to the environment, which, in turn, may inform the user which subjects may be included in video framing actions and which subject may be excluded from video framing actions.

Display 300 may be associated with any suitable type of device. Non-limiting examples of display devices include displays associated with mobile devices, laptops, computers, televisions, projectors, or any other suitable device for displaying a video output, a video stream, a representation of the top-view of a meeting region and/or the video conference, or any other video or image. In some cases, display 300 may be touch sensitive.

As shown in FIG. 3, spatial envelope 310 may comprise the boundaries of meeting region 320, which may include a region within meeting room 210. And as noted above, spatial envelope 310 may be used to determine whether each person 240*a-d* is located inside or outside the meeting region 320. For example, persons located within spatial envelope 310 may be determined to be within the meeting region 320, and persons located outside of spatial envelope 310 may be determined to be outside the meeting region 320. Furthermore, in some embodiments, a trained machine learning system (e.g., trained neural network), as discussed above, may receive the video output (including at least one frame or image) and output an indication of whether each person 240a-d is located within spatial envelope 310/meeting region 320.

As shown in FIG. 3, spatial envelope 310 may include predetermined dimensions, such as 2.9 m×3.8 m. The predetermined dimensions may be automatically determined based on various characteristics within or of the meeting region 320. For example, the predetermined dimensions of spatial envelope may include and be determined based on one or more of the dimensions of the meeting room, a length of one or more walls or barriers (e.g., a partial wall) associated with the meeting room, a location of one or more corners at intersections of walls of the meeting room, etc. For example, distances to one or more corners of a room may be determined (e.g., using a trained network, LIDAR, etc.), and that depth information along with image locations of the detected corners (e.g., corners 140a, 140b, shown in FIG. 1) may be used to automatically set dimensions of spatial envelope 310/meeting region 320. Similarly, a determined distance to at least one barrier present in the environment (e.g., a wall, partial wall, column, etc.) may be used in automatically determining dimensions of spatial envelope 310/meeting region 320.

In some cases, dimensions of envelope 310 may be determined based on one or more items present in the environment. For example, as shown in FIG. 3, predetermined dimensions of spatial envelope 310 may be determined based on dimensions of conference table 280. The dimensions of envelope 310 may be selected such that spatial envelope 310 encompasses the conference table 250 and a buffer region (e.g., 1 m, 2.5 m, 2 m, etc.) relative to one or more sides of conference table 250.

FIG. 3 illustrates a spatial envelope 310 with predetermined dimensions of 2.9 m×3.8 m, however, it is contemplated that the predetermined dimensions may be any suitable dimension(s) that reside within the environment. For example, the environment may include meeting room 210 with dimensions 4 m×5 m. It is contemplated that the predetermined dimensions of spatial envelope 310 may be less than or equal to the dimensions of meeting room 210.

Furthermore, in some embodiments, the predetermined dimensions may be determined based on an input from a user. For example, display 300 may allow the user to input specified distance values to use as the predetermined dimensions. The user may input the specified distance values via drop-down menu, selection from multiple options, fields that allow the user to input values, drag and click highlighting tool 330 (e.g., using a mouse, e-pencil, stylus, or other type of input device), a drawing tool, or any other suitable method for allowing the user to input desired values into a user device or display. Additionally, or alternatively, the user may set the size, or dimensions, of spatial envelope 310 by drawing a desired spatial envelope 310 with or without inputting specified distance values. For example, display 300 may include a touch screen (or any other touch-sensitive display) which may, as shown in FIG. 3, allow a user to set the size, or dimensions, of spatial envelope 310 by using drag and click highlighting tool 330, a lasso feature, etc. Furthermore, in some embodiments, the video processing unit may, in response to the input from the user, automatically show on a display (e.g., display 300) the representation of meeting region 320.

Figures 4A, 4B:
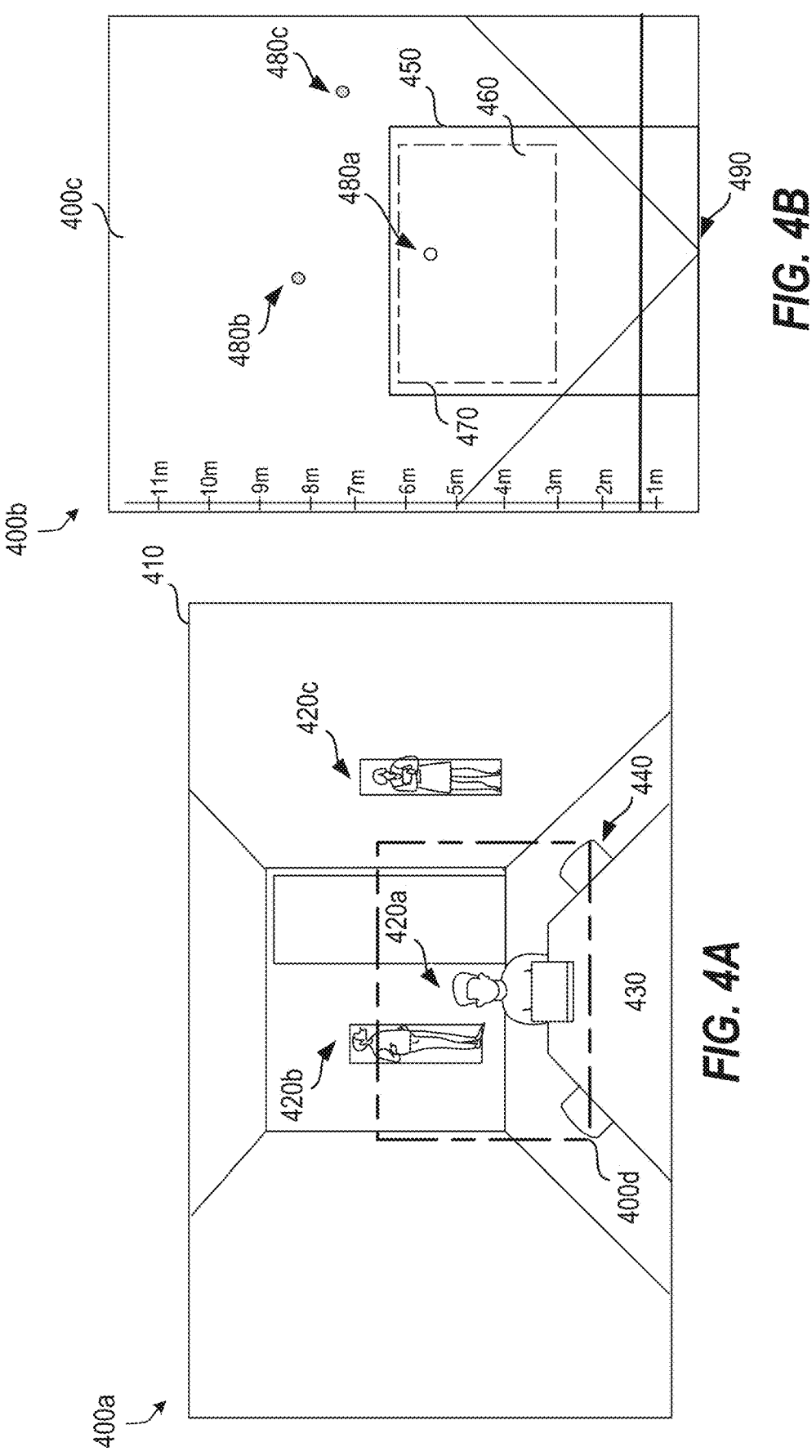
FIG. 4A is an illustration of another example video output generated by a video conferencing camera, consistent with some embodiments of the present disclosure.
FIG. 4B is a diagrammatic representation of a top-view of the environment of FIG. 4A, consistent with some embodiments of the present disclosure.

FIG. 4A illustrates another example video output 400a generated by a video conferencing camera, and FIG. 4B provides a diagrammatic representation of a top-view 400b of the environment of FIG. 4A. As shown in FIG. 4A, representations of persons 420a-c may be captured in video output 400a. Person 420a may be located within a meeting room with glass walls 410. The meeting room may also include conference table 430 and chairs 440. Persons 420b, 420c may be located outside the meeting room, but may still be visible in video output 400a due to the walls of the meeting room being glass (or at least partially transparent or able to be seen through).

As shown in FIG. 4B, a top-view 400b of the environment captured by video output 400a may be provided. Diagrammatic representations 480a-480c of persons 420a-420c may be shown in the top-view 400b of the environment, and the field of view 400c of video conferencing camera 490 may be shown. A representation of the meeting room 450 may be shown, and a meeting region 460, encompassed by spatial envelope 470, within meeting room 450 may be displayed. Although it is shown that spatial envelope 460 is rectangular and located within meeting room 450, it is contemplated that spatial envelope 460 may be any suitable shape and be located within, or may be the same size and shape as meeting room 450. It is further contemplated that spatial envelope 460 may include at least a portion of meeting room 450 and at least a portion of environment surrounding meeting room 450.

In some embodiments, detection of an event may cause the video processing unit to update the predetermined dimensions of spatial envelope 470. For example, a second conference table (not shown) may be moved, or added, into the environment or meeting room 450, and the predetermined dimensions of spatial envelope 470 may be update based on the detected addition to include the second conference table (not shown) and/or any buffer region relative to one or more sides of the second conference table. Other non-limiting examples of an event may include the entry of another person into the meeting room 450; a voice determined to be outside of the meeting region or spatial envelope; and a movement of one or more furniture items (e.g., table, chair, desk) within, into, or out of the meeting region 460.

The video processing unit may further determine a frame configuration for a primary video stream to be shown on the display based on one or more characteristics of a subject that is determined to be located within the meeting region. The frame configuration may constitute a portion of the video output. As used herein, a frame configuration may pertain to a particular size and/or location of a frame (e.g., within an overview video stream) to be displayed as a primary video stream output. A frame associated with a primary video stream may represent all or part of a frame associated with an overview video stream from which the primary video stream is derived. The framing of the primary video stream may be determined based on various operational policies and detected events and/or characteristics of subjects in an environment. For example, a frame associated with a primary video stream may be selected to highlight a speaker, a listener, an object (e.g., a whiteboard, etc.), two or more meeting participants, etc.

Figure 4C:
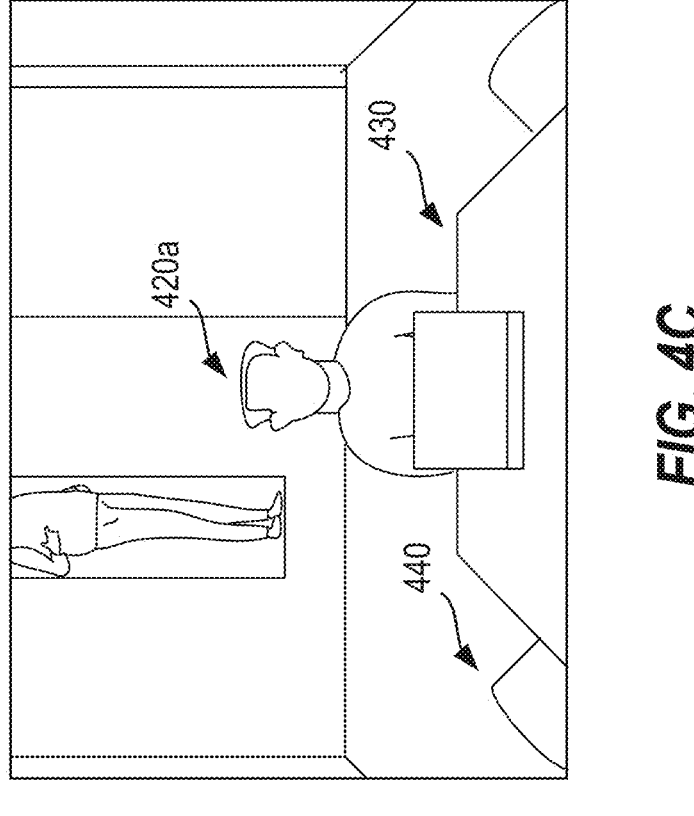
FIG. 4C is an illustration of a frame configuration constituting a portion of the example video output of FIG. 4A, consistent with some embodiments of the present disclosure.

Referring to FIG. 4A, in some embodiments, the portion of the video output constituting the primary video stream may represent an entirety of the video output 400a associated with an overview video stream. In other embodiments the video processing unit may determine a frame configuration 400d for the primary video stream, as shown in FIG. 4C, that is less than a full frame of the overview video stream. FIG. 4C illustrates a frame configuration 400d including representations of person 420a, conference table

430, and chairs 440. Furthermore, in determining the frame configuration for the primary video stream, the video processing unit may ignore one or more persons determined to be located outside the meeting region. For example, referring to FIGS. 4A and 4C, persons 420b, 420c may be determined to be outside the meeting room/region (e.g., based on any of the techniques discussed herein, alone or in any combination). Thus, actions or characteristics of persons 420b, 420c may be ignored in the determination of frame configuration 400d. In some embodiments, the ignoring may include omitting persons (e.g., person 420c) from the determined frame configuration 400d. Furthermore, in some embodiments, any movements or sounds made by persons 420b, 420c may be ignored by the video processing unit in determining frame 400d. Further, frame configuration 400d may remain unchanged (e.g., may remain focused on person 420a) despite detection of movement or sound from one or more of persons 420b, 420c.

The video processing unit may determine frame configuration 400d for the primary video stream based on a determination that person 420a is speaking. Other characteristics that may contribute to the determination of the frame configuration of the primary video stream to be shown on the display may include—but are not limited to—a determination that a person in the meeting region is listening or reacting to a speaker, a determination of whether a representation of a person in the meeting region overlaps with a representation of another person in the meeting region (or multiple people), a distance between the person in the meeting region and another person in the meeting region (or multiple people), and/or a facing direction of the person in the meeting region.

Figure 5:
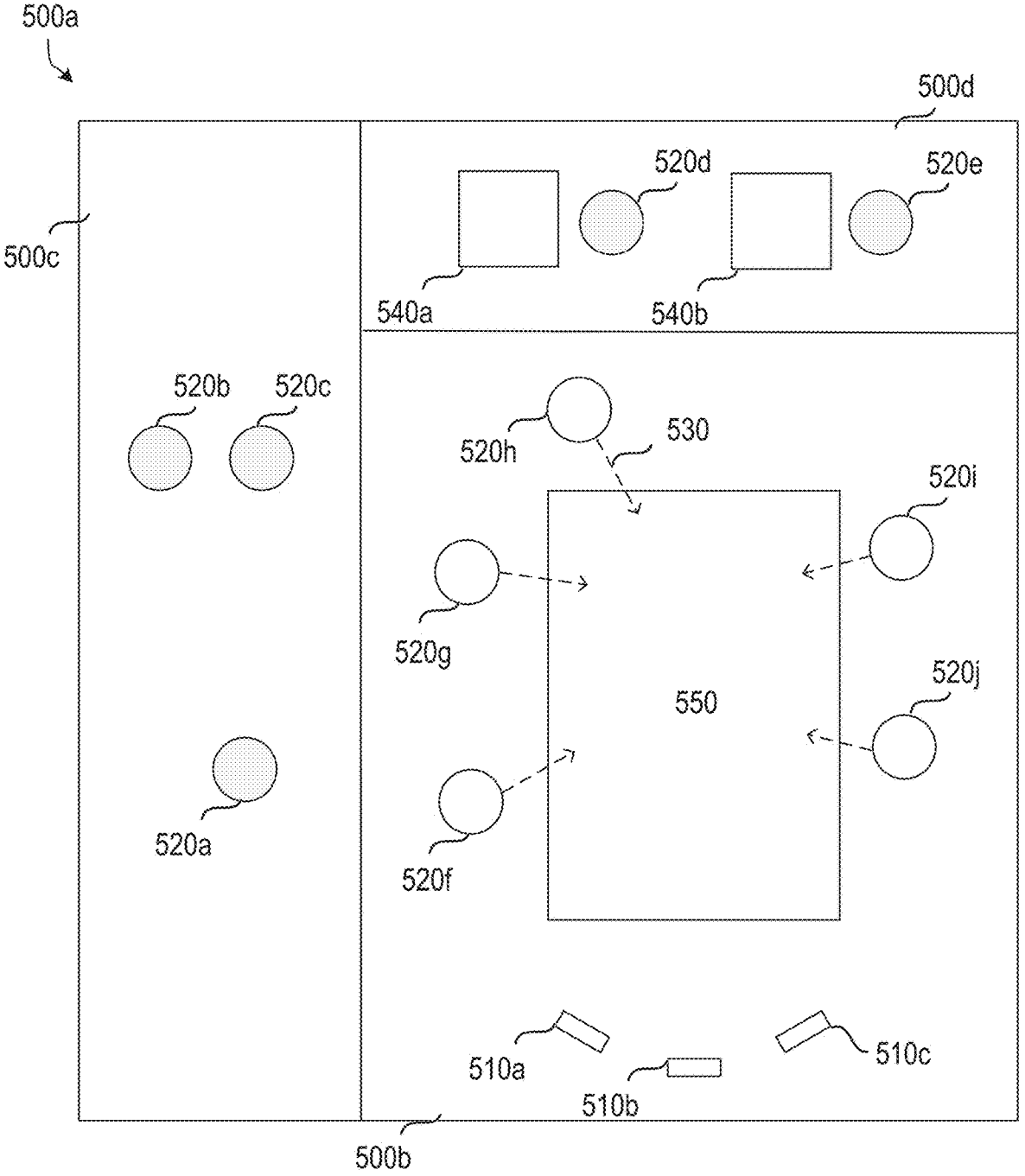
FIG. 5 is a diagrammatic representation of a top-view representation of an environment, including a meeting region, a hallway, and an office space, consistent with some embodiments of the present disclosure.

In some embodiments, the video conferencing camera may communicate with another video conferencing camera to provide a multi-camera video conferencing system, and the determination of whether each person is inside or outside the meeting region may be based on an output of a trained system, such as a trained neural network (as discussed above). FIG. 5 is a diagrammatic representation of a top-view of an environment 500a, including a meeting room 500b, hallway 500c, and office space 500d. As shown in FIG. 5, video conferencing cameras 510a-c may communicate with each other, resulting in a multi-camera video conferencing system. In addition to being distributed across different rooms or spaces in an environment, in some cases, video conferencing cameras 510a-c may be distributed within a single meeting room/region. Different overview video streams collected by the different video cameras in a multi-camera system may offer opportunities for variations in shots framed in a primary video stream output by the camera system. For example, in cases where a subject A is represented in outputs of more than one camera in the system, the video processing unit may determine which camera output to use in generating a shot of subject A. The selection may be based on orientation of subject A relative to the cameras (e.g., a frontal shot may be preferred over a side shot, an over the shoulder shot from showing the back of subject A may be preferred to a frontal shot, etc.) or relative to other subjects (e.g., whether subject A overlaps with another subject in one or more of the available overview video streams).

Meeting room 500b may include video conferencing cameras 510a-c, persons 520f-j, and conference table 550. Each person 520f-j may be associated with a head pose 530, and the head pose may be associated with a direction that each person 520f-j is looking. For example, person 520h may be looking at video conferencing camera 510c, and the head pose 530 associated with person 520h may be a vector directed toward video conferencing camera 510c. Hallway 500c may include persons 520a-c. Persons 520a-c may be walking past meeting room 500b, standing outside of meeting room 500b, or preparing to enter meeting room 500b. Office space 500d may include desks 540a, 540b. Persons 520d, 520e may each be sitting or standing at their respective desks 540a, 540b. In some embodiments, meeting room 500b may include glass walls, windows, or screens that may allow persons 520a-e located in hallway 500c and/or office space 500d to be visible in a video output captured by one or more of video conferencing cameras 510a-c.

Embodiments of the present disclosure may determine a spatial envelope or meeting region based on detected characteristics of persons 520a-j over time. For example, the position or location of each person 520a-j may be recorded over time, such as over the duration of a video conference or meeting. A detected cluster of people may be indicative of a relevant meeting region, such as meeting room 500b. Boundaries of the meeting region may be determined based on the location of the detected cluster of people.

Other techniques may be employed for determining which subjects in an environment should be used in determining a frame of a primary video stream output. For example, in some embodiments, participant scores may be calculated for each person 520a-j that is detected or visible in an overview video output. A participant score may correspond to a probability or the likelihood that each person 520a-j is a participant of a meeting and/or inside a meeting region, and thus may determine whether each person 520a-j is inside or outside the determined meeting region. A higher participant score may correspond to a higher likelihood that a person 520a-j is a participant of the meeting and/or inside the meeting region. For example, person 520f may be associated with a participant score of 90%, and person 520d may be associated with a participant score of 30%. The video processing unit may determine that person 520f is a meeting participant and/or inside the meeting region, and may determine that person 520d is not. Although the examples provided herein relate to percentages, it is contemplated that the participant score may be conveyed in any form, such as—but not limited to—a numerical value, a color, and/or a shape. The participant score for each person 520a-j may be determined based on a combination of a determined location for each person 520a-j, a determined motion associated with each person 520a-j, and a detected interaction between each person 520a-j with another person (e.g., another person of persons 520a-j). Furthermore, the combination may be a weighted combination or may include any other mathematical operations, alone or in combination.

Additionally, or alternatively, the participant score for each person 520a-j may be determined based on whether each person 520a-j: is an active speaker, is looking at one of video conferencing cameras 510a-c, is looking at the active speaker, is within a determined meeting region (e.g., spatial envelope), is sitting or standing (e.g., persons 520a-j that are determined to be sitting may have a higher participant score), and/or is located near an active participant. The direction that a person 520a-j is looking may correspond to a head pose 530 associated with person 520a-j. Furthermore, if it is determined that a person 520a-j is looking directly at a center camera (such as video conferencing camera 510b) or is looking at an active speaker, the participant score of person 520a-j may be higher.

Figure 6C:
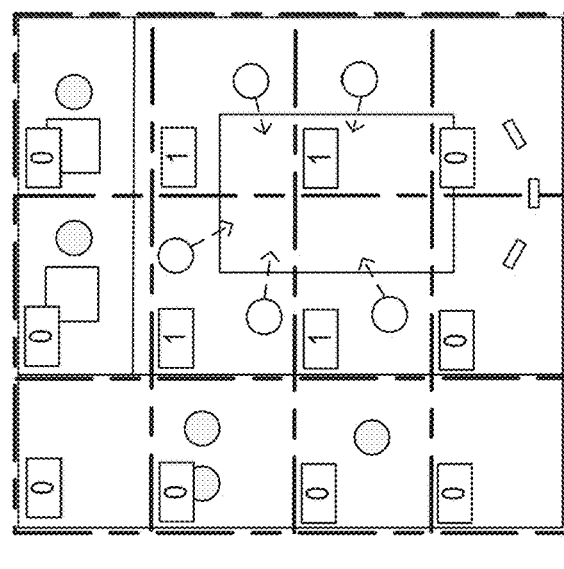
FIGS. 6A-6C are diagrammatic representations of techniques for determining a meeting region of an environment, consistent with some embodiments of the present disclosure.
Figure 6B:
Figure 6B:
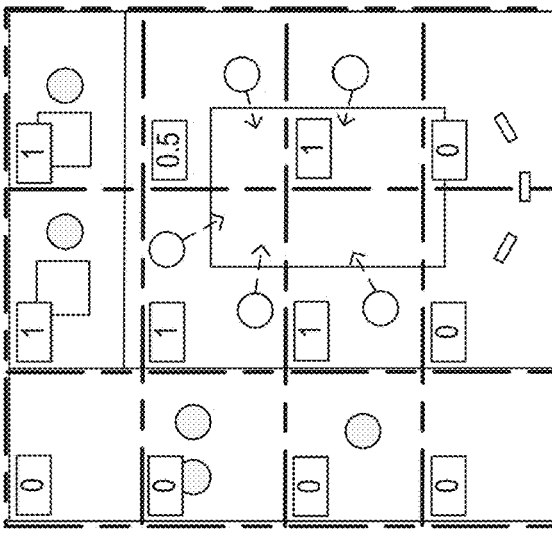
Figure 6A:
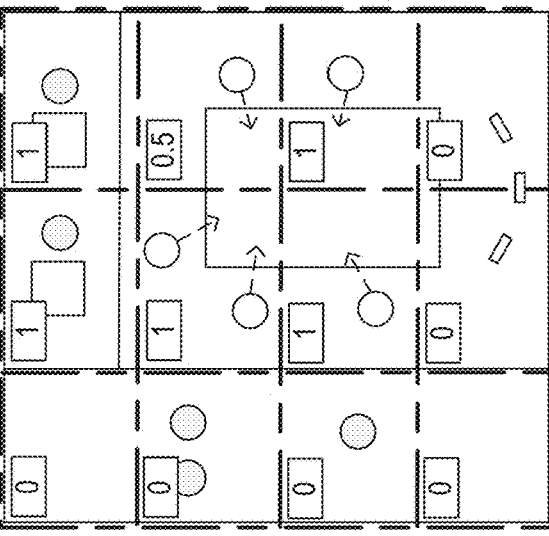

FIGS. 6A-6C are diagrammatic representations of example techniques for determining a meeting region of an environment. As shown in FIGS. 6A-6C, a top-view representation of an environment may be divided into a plurality of cells, and each cell may be given a weight or value (e.g., 0, 0.5, and 1). FIG. 6A illustrates weights or values assigned to each cell based on locations of people. Cells that include representations of persons determined to be sitting or stationary may be given a higher weight or value than cells that do not. FIG. 6B illustrates weights or values assigned to each cell based on a visit frequency, where a visit frequency may pertain to cells that are considered to correspond to areas that are visited frequently by detected persons. Cells that are determined to be visited frequently (e.g., based on tracking the position or location of each person in an environment) may be given a higher weight or value than cells that are not. FIG. 6C illustrates weights or values assigned to each cell based on engagement, where engagement may be determined based on whether people are determined to be engaged in a meeting (e.g., speaking, looking at an active speaker, looking at a center camera). Cells that include people that are determined to be engaged in the meeting may be given a higher weight or value than cells that are not. FIGS. 6A-6C illustrate weights or values assigned to cells based on a scale (e.g., 0-1), however, it is contemplated that the weights or values assigned to the cells may include numerical values, colors, and/or shapes.

Figure 7:
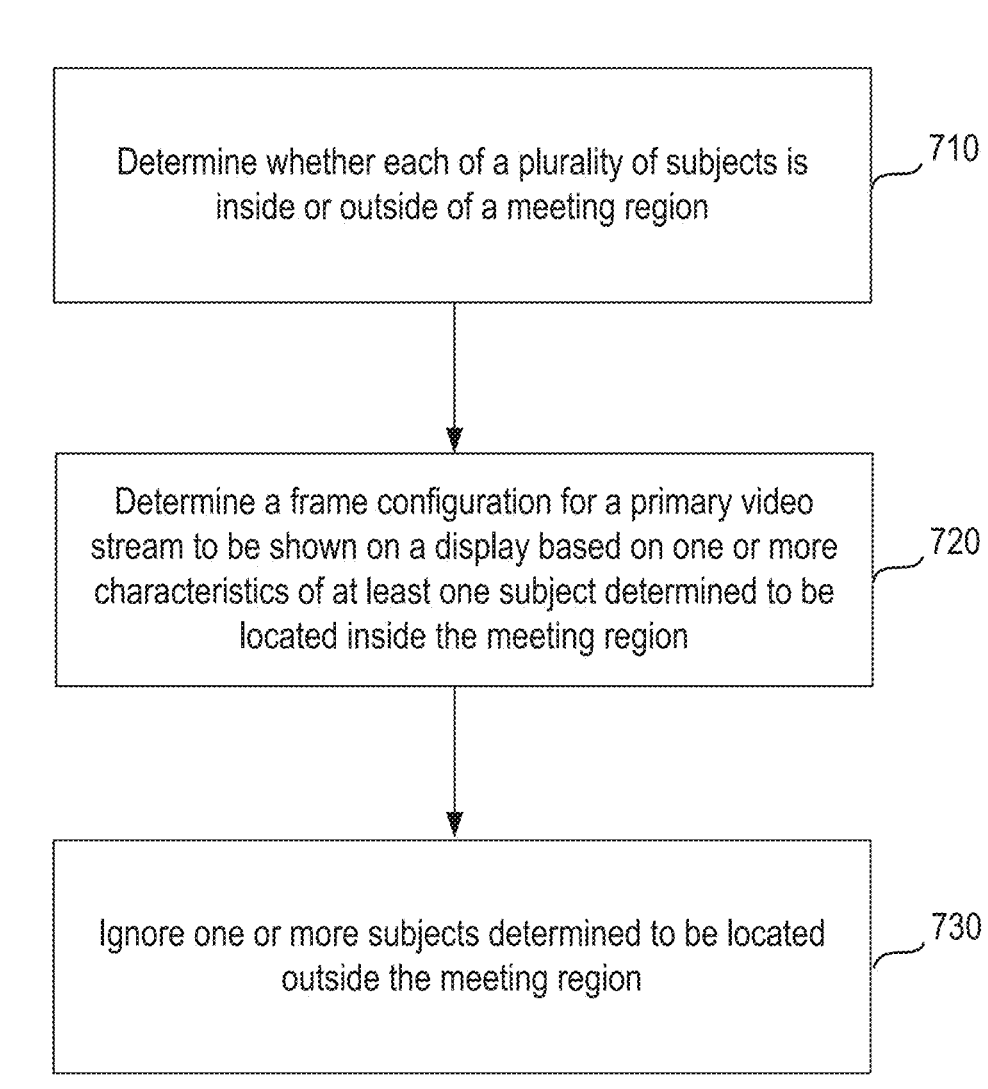
FIG. 7 illustrates a flowchart of an example method for generating a video output representative of an environment and determining a frame configuration for a primary video stream, consistent with some embodiments of the present disclosure.

Embodiments of the present disclosure may include a method for generating a video output representative of an environment. For example, FIG. 7 illustrates a flowchart of an example method 700 for generating a video output representative of an environment and determining a frame configuration for a primary video stream. As shown in step 710 of FIG. 7, method 700 may comprise determining, for a plurality of subjects represented in the video output, whether each of the plurality of subjects is inside or outside of a meeting region within the environment. As shown in step 720 of FIG. 7, method 700 may further comprise determining a frame configuration for a primary video stream, constituting a portion of the video output, to be shown on a display based on one or more characteristics of at least one subject, among the plurality of subjects, determined to be located inside the meeting region. Furthermore, as shown in step 730 of FIG. 7, method 700 may comprise, in determining the frame configuration for the primary video stream, ignoring one or more subjects among the plurality of subjects, among the plurality of subjects, determined to be located outside the meeting region.

Embodiments of the present disclosure may involve a video conferencing camera configured to generate a video output representative of an environment. The video conferencing camera may comprise a video processing unit. The video processing unit may be configured to determine, using a trained neural network, a meeting region within the environment based on one or more glass barriers. The video processing unit may further transmit, to a user display, a graphical representation of the environment and the meeting region, wherein the graphical representation includes a top view of the environment and the meeting region. In some embodiments, the user display may be a touch-sensitive display. Furthermore, in some embodiments, the top view may be a two-dimensional or a three-dimensional display. In some embodiments of the present disclosure, the video processing unit may receive, via the user display, at least one user input, and the at least one user input may be received via a drag and click highlighting tool. The video processing unit may adjust, based on the at least one user input, one or more dimensions of the meeting region. Furthermore, in some embodiments, the video processing unit may be configured to determine, for a plurality of subjects represented in the video output, whether each of the plurality of subjects is inside or outside of a meeting region within the environment. The video processing unit may be further configured to determine a frame configuration for a primary video stream, constituting a portion of the video output, to be shown on a display based on one or more characteristics of at least one subject, among the plurality of subjects, determined to be located inside the meeting region. Furthermore, the video processing unit may be configured to, in determining the frame configuration for the primary video stream, ignore one or more subjects, among the plurality of subjects, determined to be located outside the meeting room.

Consistent with embodiments of the present disclosure, a video conferencing camera configured to generate a video output representative of an environment may be provided, and the video conferencing camera may include a video processing unit configured to determine, for a plurality of subject represented in the video output, whether each of the plurality of subject is inside or outside of a meeting region within the environment by calculating a participation score for each subject of the plurality of subjects. The participation score for each subject may be, in some embodiments, calculated based on a weighted combination of a determined location for the particular subject, a determined motion associated with the particular subject, and a detected interaction between the particular subject and at least one other subject among the plurality of subjects. Furthermore, in some embodiments, the participation score may be calculated based on any combination of the previously-mentioned data/factors and one or more of the following: a determined active speaker, a determined head pose of at least one subject of the plurality of subjects (e.g., looking at a camera or looking at an active speaker), and a determination of at least one subject of the plurality of subjects located within a particular radius (e.g., 1.5 m) of a subject determined to be an active speaker (e.g., at least one subject determined to be a neighbor of an active speaker). In some embodiments, a heat map (such as a position map, or position heat map, that indicates where active participants are located) may be generated based on the participation score for each subject of the plurality of subjects and/or any of the previously mentioned data/factors. For example, in some embodiments, a position heat map may include a grid of cells overlaying a graphical representation of an environment, and the number of times (or how often) a subject enters or remains in each cell, the frequency that a subject visits each cell, and/or an increased rate of subjects that enter each cell may be determined. As an example, a higher number of subjects in a cell, a higher frequency of subjects entering the cell, and/or a higher rate of subjects that enter the cell may result in the cell being colored (or using any other indication) such that the cell indicates that active participants are located in the area represented by the cell and/or such that the cell indicates that the area represented by the cell is likely included within a meeting region. In some embodiments, the video processing unit may be further configured to determine a frame configuration for a primary video stream, constituting a portion of the video output, to be shown on a display based on a participation score for at least one subject, among the plurality of subjects, determined to be located inside the meeting region. Furthermore, the video processing unit may be configured to, in determining the frame configuration for the primary video stream, ignore one or more subjects, among the plurality of subjects, determined to be located outside the meeting region.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. While certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

In some embodiments, operations and functions performed by a disclosed system, or by a video processing unit of a disclosed multi-camera system, may additionally or alternatively be implemented as steps of a method or process. In some embodiments, the steps of methods disclosed herein may be performed by features of disclosed systems (e.g., by a video processing unit of a multi-camera system disclosed herein).

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Throughout this application, various embodiments of the present disclosure may be presented in a range format. It should be understood that the description in range format is merely for convenience and brevity and should not be construed as an inflexible limitation on the scope of the present disclosure. Accordingly, the description of a range should be considered to have specifically disclosed all the possible subranges as well as individual numeric values within that range. For example, description of a range such as from 1 to 6 should be considered to include subranges such as from 1 to 3, from 1 to 4, from 1 to 5, from 2 to 4, from 2 to 6, from 3 to 6, and so forth, as well as individual numbers within that range, for example, 1, 2, 3, 4, 5, and 6. This applies regardless of the breadth of the range.

The following numbered clauses set out a number of non-limiting aspects of the present disclosure:

1. A video conferencing camera configured to generate a video output representative of an environment, the video conferencing camera comprising: one or more video processing units configured to: determine, for a plurality of subjects represented in the video output, whether each of the plurality of subjects is inside or outside of a meeting region within the environment; determine a frame configuration for a primary video stream, constituting a portion of the video output, to be shown on a display based on one or more characteristics of at least one subject, among the plurality of subjects, determined to be located inside the meeting region; and in determining the frame configuration for the primary video stream, ignore one or more subjects, among the plurality of subjects, determined to be located outside the meeting region.

2. The video conferencing camera of clause 1, wherein the determination of whether each of the plurality of subjects is inside or outside of the meeting region includes a determination of whether each of the plurality of subjects resides on a side of a glass barrier opposite to the video conferencing camera.

3. The video conferencing camera of clause 2, wherein the glass barrier includes a glass wall.

4. The video conferencing camera of clause 2, wherein the glass barrier includes a window.

5. The video conferencing camera of clause 2 or 3, wherein the determination of whether each of the plurality of subjects resides on the side of the glass barrier opposite to the video conferencing camera is performed using a trained neural network.

6. The video conferencing camera of any of clauses 1-5, wherein the determination of whether each of the plurality of subjects is inside or outside of the meeting region includes a determination of whether each of the plurality of subjects resides within a spatial envelope with predetermined dimensions.

7. The video conferencing camera of clause 6, wherein the predetermined dimensions are automatically determined based on at least one characteristic of the meeting region.

8. The video conferencing camera of clause 7, wherein the at least one characteristic of the meeting region includes a presence of at least one furniture item within the meeting region.

9. The video conferencing camera of clause 8, wherein the at least one furniture item includes a conference table.

10. The video conferencing camera of clause 9, wherein the predetermined dimensions are selected such that the spatial envelope encompasses the conference table and a buffer region relative to one or more sides of the conference table.

11. The video conferencing camera of clause 7, wherein the at least one characteristic of the meeting region includes a determined distance to at least one barrier present in the environment.

12. The video conferencing camera of clause 7, wherein the at least one characteristic of the meeting region includes a determined distance to at least one corner between two adjacent walls present in the environment.

13. The video conferencing camera of clause 6, wherein the predetermined dimensions are determined based on an input from a user.

14. The video conferencing camera of clause 13, wherein the input from the user specifies distance values to use as the predetermined dimensions.

15. The video conferencing camera of clause 13 or 14, wherein the input is received through user interaction with a user display showing a representation of at least a portion of the environment.

16. The video conferencing camera of clause 15, wherein the representation of the at least a portion of the environment includes a representation of a conference table present in the environment.

17. The video conferencing camera of clause 15, wherein the representation of the at least a portion of the environment includes a top-view representation of the at least a portion of the environment.

18. The video conferencing camera of any of clauses 13-15, wherein the one or more video processing units are further configured to automatically show on the display a representation of the meeting region in response to the input from the user.

19. The video conferencing camera of clause 15, wherein the user display is a touch-sensitive display.

20. The video conferencing camera of clause 15, wherein the user interaction includes an operation of at least one input device to activate on the user display a drag and click highlighting tool.

21. The video conferencing camera of clause 6, wherein the one or more video processing units are further configured to update the predetermined dimensions of the spatial envelope in response to a detection of a triggering event.

22. The video conferencing camera of clause 21, wherein the triggering event includes an addition of one or more furniture items to the environment.

23. The video conferencing camera of clause 1, wherein the determination of whether each of the plurality of subjects is inside or outside of the meeting region is based on an output of a trained neural network.

24. The video conferencing camera of clause 23, wherein the trained neural network receives as input at least one frame of the video output and outputs an indication of whether each of the plurality of subjects resides on a side of a glass wall opposite to the video conferencing camera.

25. The video conferencing camera of clause 23, wherein the trained neural network receives as input at least one frame of the video output and outputs an indication of whether each of the plurality of subjects resides within a spatial envelope of predetermined dimensions.

26. The video conferencing camera of clause 23, wherein the trained neural network is configured to infer and output a distance between the video conferencing camera and each of the plurality of subjects to provide a plurality of distance values, and wherein the determination of whether each of the plurality of subjects is inside or outside of the meeting region is based on the plurality of distance values.

27. The video conferencing camera of any of the previous clauses, wherein the determination of whether each of the plurality of subjects is inside or outside of the meeting region is based on a distance measurement representative of a distance between each of the plurality of subjects and the video conferencing camera.

28. The video conferencing camera of any of the previous clauses, wherein the one or more characteristics of the at least one subject includes a determination that the at least one subject is speaking.

29. The video conferencing camera of any of the previous clauses, wherein the one or more characteristics of the at least one subject includes a determination that the at least one subject is listening or reacting to a speaker in the meeting region.

30. The video conferencing camera of any of the previous clauses, wherein the one or more characteristics of the at least one subject includes a determination of whether a representation of the at least one subject overlaps with a representation of one or more of the plurality of subjects.

31. The video conferencing camera of any of the previous clauses, wherein the one or more characteristics of the at least one subject includes a distance between the at least one subject and one or more of the plurality of subjects.

32. The video conferencing camera of any of the previous clauses, wherein the one or more characteristics of the at least one subject includes a facing direction of the at least one subject.

33. The video conferencing camera of any of the previous clauses, wherein the ignoring the one or more subjects, among the plurality of subjects, determined to be located outside the meeting region includes omitting the one or more subjects from the determined frame configuration for the primary video stream.

34. The video conferencing camera of any of the previous clauses, wherein the ignoring the one or more subjects, among the plurality of subjects, determined to be located outside of the meeting region includes not changing the frame configuration for the primary video stream in response to a detected movement by the one or more subjects.

35. The video conferencing camera of any of the previous clauses, wherein the ignoring the one or more subjects, among the plurality of subjects, determined to be located outside the meeting region includes not changing the frame configuration for the primary video stream in response to a determination that the one or more subjects is speaking.

36. The video conferencing camera of any of the previous clauses, wherein the portion of the video output constituting the primary video stream represents an entirety of the video output.

37. The video conferencing camera of any of the previous clauses, wherein the portion of the video output constituting the primary video stream represents less than an entirety of the video output.

38. The video conferencing camera of any of the previous clauses, wherein the video conferencing camera is configured to communicate with at least one additional video conferencing camera to provide a multi-camera video conferencing system.

39. The video conferencing camera of any of the previous clauses, wherein the determination of whether each of the plurality of subjects is inside or outside of the meeting region is based on lateral and longitudinal coordinates, relative to a top-view representation of at least a portion of the environment, determined for each of the plurality of subjects.

40. The video conferencing camera of clause 39, wherein the lateral and longitudinal coordinates for a particular subject, among the plurality of subjects, are determined based on an indicator of depth and an angle α between an optical axis of the video conferencing camera and a vector from a location of the video conferencing camera to a location associated with the particular subject.

41. The video conferencing camera of any of the previous clauses, wherein the determination of whether each of the plurality of subjects is inside or outside of the meeting region is based on a determined three-dimensional position associated with each of the plurality of subjects.

42. The video conferencing camera of any of the previous clauses, wherein the determination of whether each of the plurality of subjects is inside or outside of the meeting region is based on a participant score determined for each of the plurality of subjects.

43. The video conferencing camera of clause 42, wherein the participant score represents a likelihood that a particular subject, among the plurality of subjects, is inside the meeting region.

44. The video conferencing camera of clause 42 or 43, wherein the participant score for each particular subject, among the plurality of subjects, is based on a combination of a determined location for the particular subject, a determined motion associated with the particular subject, and a detected interaction between the particular subject and at least one other subject among the plurality of subjects.

45. The video conferencing camera of clause 44, wherein the combination is a weighted combination.

46. The video conferencing camera of clause 38, wherein the determination of whether each of the plurality of subjects is inside or outside of the meeting region is based on an output of a trained neural network.

47. The video conferencing camera of clause 42, wherein a position map is generated based on the participant score determined for each of the plurality of subjects.

48. The video conferencing camera of any of the previous clauses, wherein the video processing unit is located within the video conferencing camera.

49. The video conferencing camera of any of the previous clauses, wherein the video processing unit is distributed among multiple cameras, devices, or servers.

50. The video conferencing camera of any of the previous clauses, wherein the video processing unit is located remotely from the video conferencing camera.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A video conferencing camera configured to generate a video output representative of an environment, the video conferencing camera comprising:

at least one video processing unit configured to:

determine, for a plurality of subjects represented in the video output, whether each of the plurality of subjects is inside or outside of a meeting region within the environment based on a determination of whether each of the plurality of subjects resides on a side of a glass barrier opposite to the video conferencing camera;

determine a frame configuration for a primary video stream, constituting a portion of the video output, to be shown on a display based on one or more characteristics of at least one subject, among the plurality of subjects, determined to be located inside the meeting region; and in determining the frame configuration for the primary video stream, ignore one or more subjects, among the plurality of subjects, determined to be located outside the meeting region.

2. The video conferencing camera of claim 1, wherein the glass barrier includes a glass wall.

3. The video conferencing camera of claim 1, wherein the glass barrier includes a window.

4. The video conferencing camera of claim 1, wherein the determination of whether each of the plurality of subjects resides on the side of the glass barrier opposite to the video conferencing camera is performed using a trained neural network.

5. A video conferencing camera configured to generate a video output representative of an environment, the video conferencing camera comprising:

at least one video processing unit configured to:

determine, for a plurality of subjects represented in the video output, whether each of the plurality of subjects is inside or outside of a meeting region within the environment based on a determination of whether each of the plurality of subjects resides within a spatial envelope with predetermined dimensions;

determine a frame configuration for a primary video stream, constituting a portion of the video output, to be shown on a display based on one or more characteristics of at least one subject, among the plurality of subjects, determined to be located inside the meeting region; and in determining the frame configuration for the primary video stream, ignore one or more subjects, among the plurality of subjects, determined to be located outside the meeting region.

6. The video conferencing camera of claim 5, wherein the predetermined dimensions are automatically determined based on at least one characteristic of the meeting region.

7. The video conferencing camera of claim 6, wherein the at least one characteristic of the meeting region includes a presence of at least one furniture item within the meeting region.

8. The video conferencing camera of claim 7, wherein the at least one furniture item includes a conference table.

9. The video conferencing camera of claim 8, wherein the predetermined dimensions are selected such that the spatial envelope encompasses the conference table and a buffer region relative to one or more sides of the conference table.

10. The video conferencing camera of claim 6, wherein the at least one characteristic of the meeting region includes a determined distance to at least one barrier present in the environment.

11. The video conferencing camera of claim 6, wherein the at least one characteristic of the meeting region includes a determined distance to at least one corner between two adjacent walls present in the environment.

12. The video conferencing camera of claim 5, wherein the predetermined dimensions are determined based on an input from a user.

13. The video conferencing camera of claim 12, wherein the input from the user specifies distance values to use as the predetermined dimensions.

14. The video conferencing camera of claim 12, wherein the input is received through user interaction with a user display showing a representation of at least a portion of the environment.

15. The video conferencing camera of claim 14, wherein the representation of the at least a portion of the environment includes a representation of a conference table present in the environment.

16. The video conferencing camera of claim 14, wherein the representation of the at least a portion of the environment includes a top-view representation of the at least a portion of the environment.

17. The video conferencing camera of claim 14, wherein the at least one video processing unit is further configured to automatically show on the display a representation of the meeting region in response to the input from the user.

18. The video conferencing camera of claim 14, wherein the user display is a touch-sensitive display.

19. The video conferencing camera of claim 14, wherein the user interaction includes an operation of at least one input device to activate on the user display a drag and click highlighting tool.

20. The video conferencing camera of claim 5, wherein the at least one video processing unit is further configured to update the predetermined dimensions of the spatial envelope in response to a detection of a triggering event.

21. The video conferencing camera of claim 20, wherein the triggering event includes an addition of one or more furniture items to the environment.

22. A video conferencing camera configured to generate a video output representative of an environment, the video conferencing camera comprising:

at least one video processing unit configured to:

determine, for a plurality of subjects represented in the video output, whether each of the plurality of subjects is inside or outside of a meeting region within the environment based on an output of a trained neural network, wherein the trained neural network receives as input at least one frame of the video output and outputs an indication of whether each of the plurality of subjects resides on a side of a glass wall opposite to the video conferencing camera;

determine a frame configuration for a primary video stream, constituting a portion of the video output, to be shown on a display based on one or more characteristics of at least one subject, among the plurality of subjects, determined to be located inside the meeting region; and in determining the frame configuration for the primary video stream, ignore one or more subjects, among the plurality of subjects, determined to be located outside the meeting region.

23. A video conferencing camera configured to generate a video output representative of an environment, the video conferencing camera comprising:

at least one video processing unit configured to:

determine, for a plurality of subjects represented in the video output, whether each of the plurality of subjects is inside or outside of a meeting region within the environment based on an output of a trained neural network, wherein the trained neural network receives as input at least one frame of the video output and outputs an indication of whether each of the plurality of subjects resides within a spatial envelope of predetermined dimensions;

determine a frame configuration for a primary video stream, constituting a portion of the video output, to be shown on a display based on one or more characteristics of at least one subject, among the plurality of subjects, determined to be located inside the meeting region; and in determining the frame configuration for the primary video stream, ignore one or more subject, among the plurality of subjects, determined to be located outside the meeting region.

24. The video conferencing camera of claim 22, wherein the trained neural network is configured to infer and output a distance between the video conferencing camera and each of the plurality of subjects to provide a plurality of distance values, and wherein the determination of whether each of the plurality of subjects is inside or outside of the meeting region is based on the plurality of distance values.

25. A video conferencing camera configured to generate a video output representative of an environment, the video conferencing camera comprising:

at least one video processing unit configured to:

determine, for a plurality of subjects represented in the video output, whether each of the plurality of subjects is inside or outside of a meeting region within the environment based on a distance measurement representative of a distance between each of the plurality of subjects and the video conferencing camera;

determine a frame configuration for a primary video stream, constituting a portion of the video output, to be shown on a display based on one or more characteristics of at least one subject, among the plurality of subjects, determined to be located inside the meeting region; and in determining the frame configuration for the primary video stream, ignore one or more subjects, among the plurality of subjects, determined to be located outside the meeting region.

26. The video conferencing camera of claim 1, wherein the one or more characteristics of the at least one subject includes a determination that the at least one subject is speaking.

27. The video conferencing camera of claim 1, wherein the one or more characteristics of the at least one subject includes a determination that the at least one subject is listening or reacting to a speaker in the meeting region.

28. The video conferencing camera of claim 1, wherein the one or more characteristics of the at least one subject includes a determination of whether a representation of the at least one subject overlaps with a representation of one or more of the plurality of subjects.

29. The video conferencing camera of claim 1, wherein the one or more characteristics of the at least one subject includes a distance between the at least one subject and one or more of the plurality of subjects.

30. The video conferencing camera of claim 1, wherein the one or more characteristics of the at least one subject includes a facing direction of the at least one subject.

31. The video conferencing camera of claim 1, wherein the ignoring the one or more subjects, among the plurality of subjects, determined to be located outside the meeting region includes omitting the one or more subjects from the determined frame configuration for the primary video stream.

32. The video conferencing camera of claim 1, wherein the ignoring the one or more subjects, among the plurality of subjects, determined to be located outside of the meeting region includes not changing the frame configuration for the primary video stream in response to a detected movement by the one or more subjects.

33. The video conferencing camera of claim 1, wherein the ignoring the one or more subjects, among the plurality of subjects, determined to be located outside the meeting region includes not changing the frame configuration for the primary video stream in response to a determination that the one or more subjects is speaking.

34. The video conferencing camera of claim 1, wherein the portion of the video output constituting the primary video stream represents an entirety of the video output.

35. The video conferencing camera of claim 1, wherein the portion of the video output constituting the primary video stream represents less than an entirety of the video output.

36. The video conferencing camera of claim 1, wherein the video conferencing camera is configured to communicate with at least one additional video conferencing camera to provide a multi-camera video conferencing system.

37. The video conferencing camera of claim 1, wherein the determination of whether each of the plurality of subjects is inside or outside of the meeting region is based on lateral and longitudinal coordinates, relative to a top-view representation of at least a portion of the environment, determined for each of the plurality of subjects.

38. The video conferencing camera of claim 37, wherein the lateral and longitudinal coordinates for a particular subject, among the plurality of subjects, are determined based on an indicator of depth and an angle α between an optical axis of the video conferencing camera and a vector from a location of the video conferencing camera to a location associated with the particular subject.

39. The video conferencing camera of claim 1, wherein the determination of whether each of the plurality of subjects is inside or outside of the meeting region is based on a determined three-dimensional position associated with each of the plurality of subjects.

40. The video conferencing camera of claim 1, wherein the determination of whether each of the plurality of subjects is inside or outside of the meeting region is further based on a participant score determined for each of the plurality of subjects.

41. The video conferencing camera of claim 40, wherein the participant score represents a likelihood that a particular subject, among the plurality of subjects, is inside the meeting region.

42. A video conferencing camera configured to generate a video output representative of an environment, the video conferencing camera comprising:

at least one video processing unit configured to:

determine, for a plurality of subjects represented in the video output, whether each of the plurality of subjects is inside or outside of a meeting region within the environment based on a participant score determined for each of the plurality of subjects, wherein the participant score for each particular subject, among the plurality of subjects, is based on a combination of a determined location for the particular subject, a determined motion associated with the particular subject, and a detected interaction between the particular subject and at least one other subject among the plurality of subjects;

determine a frame configuration for a primary video stream, constituting a portion of the video output, to be shown on a display based on one or more characteristics of at least one subject, among the plurality of subjects, determined to be located inside the meeting region; and in determining the frame configuration for the primary video stream, ignore one or more subjects, among the plurality of subjects, determined to be located outside the meeting region.

43. The video conferencing camera of claim 42, wherein the combination is a weighted combination.

44. The video conferencing camera of claim 36, wherein the determination of whether each of the plurality of subjects is inside or outside of the meeting region is based on an output of a trained neural network.

45. The video conferencing camera of claim 40, wherein a position map is generated based on the participant score determined for each of the plurality of subjects.

46. The video conferencing camera of claim 1, wherein the video processing unit is located within the video conferencing camera.

47. The video conferencing camera of claim 1, wherein the video processing unit is distributed among multiple cameras, devices, or servers.

48. The video conferencing camera of claim 1, wherein the video processing unit is located remotely from the video conferencing camera.

* * * * *